Feb. 25, 1958         F. T. BAILEY        2,825,016
ELECTRIC MOTOR CONTROL SYSTEM
Filed Feb. 15, 1954
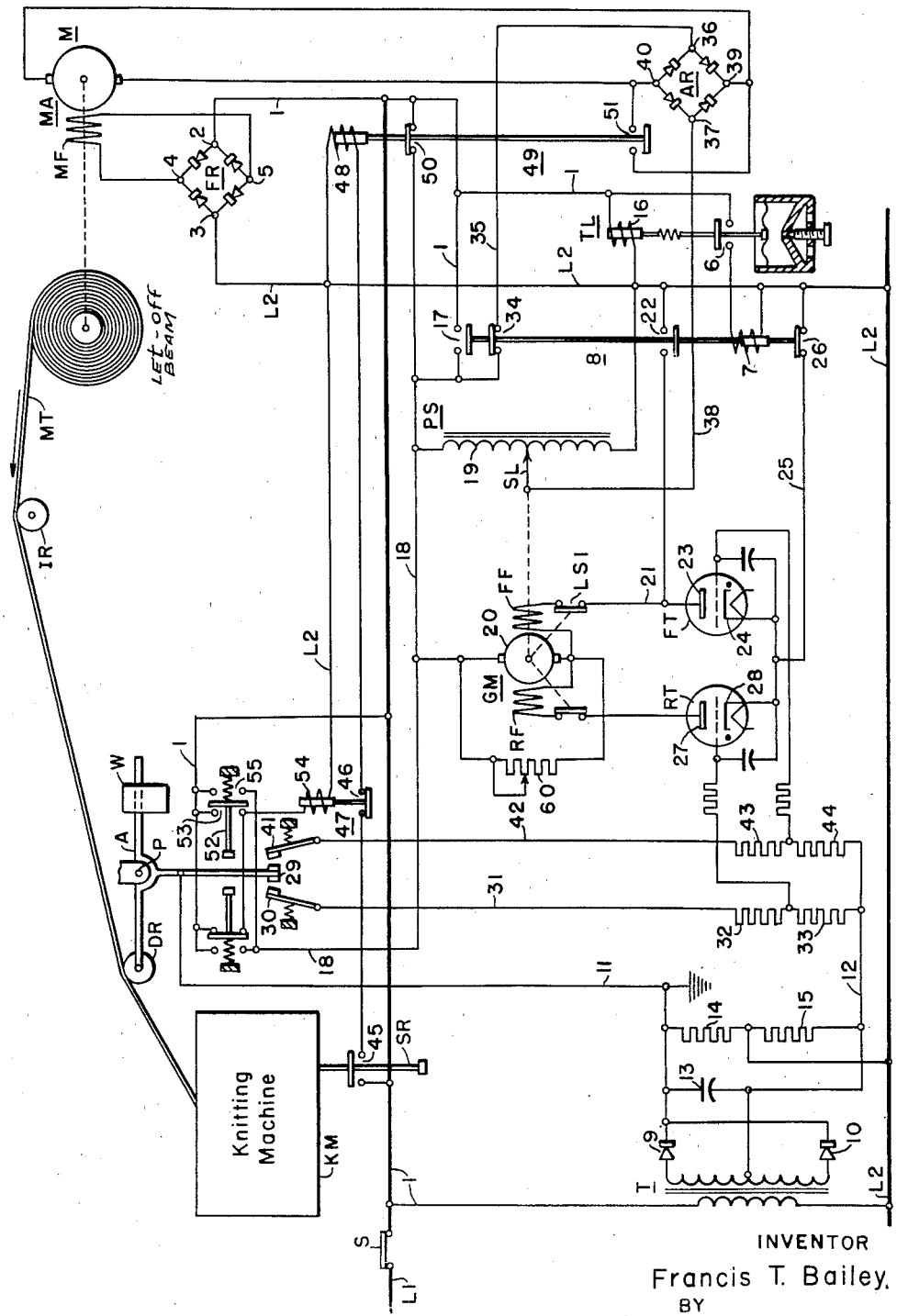
INVENTOR
Francis T. Bailey,
BY
Paul E. Friedemann
ATTORNEY

United States Patent Office 2,825,016
Patented Feb. 25, 1958

2,825,016

ELECTRIC MOTOR CONTROL SYSTEM

Francis T. Bailey, East Aurora, N. Y., assignor to Westinghouse Electric Corporation, East Pittsburgh, Pa., a corporation of Pennsylvania Application February 15, 1954, Serial No. 410,279

16 Claims. (Cl. 318—6)

This invention relates to tension controls, and relates more particularly to controls for maintaining the proper tension in material from let-off beams of textile machinery.

In textile machinery, it is common to use dancer rolls or other feeler members which respond to variations in the tension of the material being handled, and which control the speed of motors which move the material. An electronic control of this type is disclosed in the F. D. Snyder Patent No. 2,597,136. In such prior electronic controls, all of the power to the material moving motors was supplied by the closing of tension bar switches. In order for such a motor to reach an average speed, it had to be energized by a series of voltage pulses caused by the fluctuations of the dancer contacts. Wide variations in motor speed resulted, causing shading on material being handled.

This invention provides an electronic tension control in which a material moving motor is energized directly by a power source, and in which the voltage from the power source is applied continuously to the motor armature but is varied in accordance with variations in the tension of the material being handled. In one embodiment of the invention used as a beam let-off control for a knitting machine, the beam let-off motor armature is energized at a constant voltage for a given beam diameter, and when requirements call for a change in speed, the change in speed is a very small increment to match the diminishing diameter of the beam.

A feature of this invention is that when the drive is first started, a control which over-rides the tension control, supplies higher than normal voltage to the armature of the beam let-off motor for causing it temporarily to supply extra torque to overcome the increased load due to congealed grease and break-away friction.

Another feature of this invention is that when a textile machine embodying this invention is stopped, the beam let-off motor is disconnected from the power source, and a short circuit is placed across its armature, thus dynamically braking the motor and bringing it to a quick stop to hold tight tension for avoiding start marks when the machine is started up again.

Another object of this invention is temporarily to apply higher than normal voltage to the armature of a motor driving a let-off beam when the motor is first started, and then to vary the voltage to the motor in accordance with variations in the tension of material let off the beam.

Another object of this invention is quickly to stop a beam let-off motor used with a textile machine when the machine is stopped.

This invention will now be described with reference to the accompanying diagrammatic showing of one embodiment of this invention.

The direct current motor M has an armature winding MA connected to the full-wave rectifier AR and has a field winding MF connected to the full-wave rectifier FR.

The motor M drives the let-off beam carrying the material MT. In normal operation the material passes over one or more idle rollers, as IR, and then over a spring, or gravity biased dancer roll DR to the knitting machine KM, or other machine operating on the material.

The dancer roll DR is mounted on the arm A, pivoted at P and biased by the weight W adjusted to a suitable fixed position on the right-hand projection of arm A.

In the figure the parts are shown in the position they would hold during operation of the knitting machine when the tension on the material is just right and the beam let-off motor M is operating at the proper speed for the particular size of the roll of material on the let-off beam.

When the tension of the material is at the correct value the mean position of the dancer roll is as shown in the figure.

A better understanding of my contribution to the art may be obtained from an explanation of the operation of the apparatus.

Let the assumption be that the shipper rod SR is in the down position for the stopped condition of motor M and that switch S is open and that the constant voltage alternating current leads L1 and L2 are energized.

Further, let the assumption be that the material MT extends loosely, namely at low tension, from the let-off beam over the rollers IR and DR to the machine KM. Since the tension is low, which would normally be the case right after threading the material to the machine KM, the arm A will have moved clockwise to close contacts and to cause engagement of contact 29 with contact 30.

If the machine KM is to be operated and motor M is to be properly operated, the shipper rod SR is first moved to the position shown to open switch contacts 45, and then switch S is closed. This operation establishes a circuit from L1 through switch S, conductor 1, the alternating current terminals 2 and 3 of rectifier FR to the lead L2. Since the field winding MF is connected directly across the direct current terminals 4 and 5 it is apparent that the motor field winding MF is energized at a constant value. Any speed control of motor M that is to be effected takes place through a variation of the voltage being supplied to the motor armature MA.

The operation of switch S also establishes a circuit from conductor 1 through contacts 6 of the time limit relay TL, the actuating coil 7 of the control relay 8 to lead L2. This control relay thus operates immediately to close contacts 17 and 22, and to open contacts 26 and 34.

The closure of switch S also energizes the primary winding of transformer T. The secondary winding of this transformer thus applies a positive potential to lead 11 and a negative potential on lead 12 through the rectifiers 9 and 10. By reason of the filtering capacitor 13 a substantially constant direct current voltage is thus impressed across resistors 14 and 15.

Since the actuating coil 16 of the time limit relay TL is connected directly across conductors 1 and L2, the time limit relay begins its timing operation, however, as long as contacts 6 remain closed, which will be an appropriately selected time by a proper adjustment of the time limit relay TL, control relay 8 remains in operated position.

This means that a circuit is established from conductor 1 through contacts 17 of control relay 8, to conductor 18, the winding 19 of the conventional powerstat PS, or other form of variable voltage output autotransformer, to conductor L2. Another circuit is established from the energized conductor 18 through the armature 20 of the gear motor GM, through the forward field winding FF, limit switch LS1, conductor 21, and contacts 22 on control relay 8 to lead L2. The gear motor is thus fully energized for forward operation and in consequence the slider SL is rapidly moved toward the lower end of winding 19. This means a very maximum voltage will be supplied to the armature MA of the beam let-off motor, when the energizing circuit for the armature winding MA is established.

When the slider is near the lower end of winding 19 the time limit relay TL will have timed out to thus open contacts 6. The opening of contacts 6 opens the circuit for coil 7 of the control relay 8 to thus open contacts 17 and 22 and to close contacts 26 and 34.

The opening of contacts 22 opens the circuit for the gear motor GM. The closing of contacts 26 on the other hand establishes a circuit from conductor 21 through the anode 23 and cathode 24 of the forward thyratron tube FT, conductor 25 and contacts 26 to conductor L2, which circuit is in parallel to contacts 22. Conductor 25 is also connected to the cathode 28 of the reverse thyratron tube RT and the anode 27 of this same tube is in circuit with the reverse field RF of the gear motor. Whether or not the gear motor will operate after the control relay 8 has been deenergized will depend entirely on the tension in the material MT because the interconnection of the gear motor with the tubes subjects the gear motor GM to the automatically operated tension controls.

For an initial starting as here assumed the tension in the material will be low. This means that the arm A will move clockwise and thus establish a circuit from the positive conductor 11 through the vertical projection of arm A, contact 29 engaging the spring backed contact 30, conductor 31, resistors 32 and 33 to the negative conductor 12. A positive bias is thus applied to the grid of the reverse tube RT and this tube thus fires to cause the gear motor to operate to move the slider SL upwardly to decrease the voltage that this slider taps off of winding 19 of the powerstat PS. Since the position of the slider is near the bottom of the winding it is apparent that a relatively high voltage is applied to the armature winding MA of motor M. The circuit for the armature winding MA of the beam let-off motor may be traced from energized conductor 18 through contacts 34 of the control relay 8, conductor 35, the alternating current terminals 36 and 37 of the full-wave rectifier AR, conductor 38, slider SL, and a relatively small section of winding 19 to lead L2. Since the armature winding MA is connected directly to the direct current terminals 39 and 40 of the rectifier AR and a relatively high voltage appears at these terminals, a greater starting torque is provided for overcoming the increased load after a prolonged shutdown due to congealed grease and high breakaway friction. This feature is one of the important features of my system of control.

When the drive starts this increased voltage on the beam let-off motor, by reason of the position of slider SL near the bottom of winding 19, causes the motor to run at a speed sufficiently high to equal that at which it previously ran when warm and when a lower voltage was sufficient to run it at the required speed. As the friction load decreases due to the warming of the grease, the voltage will automatically adjust itself because of the action of the dancer roll controlled switches until the voltage is stable to maintain the required speed. Because each machine KM and each gear unit involved presents a friction value differing from other similar machine, the time limit relay timing cycle is adjustable to provide the correct amount of voltage rise to compensate.

As the slider SL moves up, the speed of motor M will soon be caused to match the requirements of constant tension in the normal movement of the material from the let-off beam to the machine KM for the particular size of the roll of material on the let-off beam. As soon as the motor M has attained the proper speed, contact 29 disengages the contact 30 and the slider SL will have some definite position on winding 19. The motor M thus operates continuously and for the moment at the correct speed.

The contact 29 connected to the vertical projection of arm A vibrates about the vertical position shown at a rate of approximately 480 times a minute, thus alternately making contact with the electric contacts 30 and 41 the same number of times. When the contact 29 engages with contact 30 the grid of reverse tube RT is made positive as above explained and the reverse field RF is energized.

When the contact 29 engages contact 41 a circuit is established from the positive conductor 11 through the vertical projection of arm A, contact 29, engaging contact 41, conductor 42, resistors 43 and 44 to the negative conductor 12. A positive bias is thus applied to the grid of the forward tube FT and this tube conducts. If we assume constant and proper tension then contact 29 makes contact with the contacts 30 and 41 over equal periods of time during its vibration. As long as there is no need for a change in speed due to change in diameter of the material on the let-off beam, or there is no change in tension in the material, then the two tubes conduct the same lengths of time and alternately energize the field windings FF and RF the same lengths of time. The gear motor GM thus remains at rest and the slider SL is not moved.

If, however, the tension in the material MT has increased from any cause or the diameter of the material on the let-off beam has decreased calling for a higher speed from motor M, then the contact 29 will dwell longer on contact 41 with the result that tube FT will conduct more than tube RT. The motor GF will thus move the slider down to thus increase the speed of motor M to thus decrease the tension.

If the conditions have changed calling for a reduction of speed of motor M, the contact 29 will dwell longer on contact 30 than on contact 41 with the result that tube RT will conduct more than tube FT and in consequence the slider SL will be moved up to decrease the speed of motor M.

When contact 29 does not make contact with either of the adjacent contacts 30 and 41 then a negative bias, through resistors 33 and 44 is applied to the grids of both tubes and neither tube will conduct. This condition will obtain when the machine is temporarily stopped during operation and is to be restarted without loss of tension on the material. Shading in the material is thus minimized.

When it is necessary to stop the machine the shipper rod SR is moved to the off position, i. e., is moved down in the showing in the figure, with the result that switch contacts 45 are closed to establish a circuit from conductor 1 through contacts 45 of the shipper rod SR, contacts 46 of the control relay 47, and actuating coil 48 of control relay 49 to lead L2. The operation of control relay 49 effects the opening of contacts 50 and the closing of contacts 51. The opening of contacts 50 disconnects the powerstat PS from the supply and thus disconnects the armature MA of the beam let-off motor M from the supply. The closing of contacts 51 closes a short circuit for armature MA to thus very effectively dynamically brake the motor M to stop. This dynamic braking of the motor to a stop is desirable for preventing start-marks, which, as is known, are the result of starting a textile machine with the tension in the material too low. With this braking action, the relatively small beam let-off motor stops much faster than does the relatively large main drive motor for the machine KM with the result that the tension on the yarn is increased, and when the machine KM starts up again, it starts with the yarn under tension. The resulting start mark on initial starting produces a very fine line of tight stitches, which is very much desired by the industry.

The rheostat 60 in shunt relation to the armature 20 of the gear motor GM is used to adjust the speed of the gear motor so that it does not over-operate the powerstat and cause shunting of the beam let-off motor.

From the foregoing it should be apparent that my system of control provides speed correction for both the plus and the minus direction.

If during the stopping operation just described the tension of the material MT reaches a high critical point, the vertical projection of the dancer arm A will move the contact stem 52 of the high tension switch to open the contacts 53. The opening of the contacts 53 opens the energizing circuit of the relay 47 which then opens its contacts 46. At the same time the switch contacts 45 would be closed, as is conventional, by the movement of the shipper rod switch to the "off" position for stopping the machine. Opening of the contacts 46 deenergizes the relay 49 which opens its contacts 51 and closes its contacts 50. Opening the contacts 51 prevents a short circuit from being placed across the armature of the beam let-off motor at this time. Closing of the contacts 50 connects the powerstat winding 19 to conductor 1 so that the beam let-off motor will continue to run and let off material from the beam until the high tension has been reduced at which time the high tension switch contacts 53 will move back to normal position.

The movement of the contact arm 53 of the high tension switch against the contact 55 when abnormally high tension occurs, closes a safety circuit connecting conductor 1 to the powerstat winding 19 so that the beam let-off motor will be energized to reduce the tension in the material in case the relay 8 does not function properly.

While I have shown but one diagrammatic arrangement of my invention, my invention is not limited to the particular arrangements shown, since elements and their arrangement may be modified without departing from the spirit and scope of my invention.

I claim as my invention:

1. A control system comprising a material let-off member, a first motor for driving said member, an electric power source, means including voltage varying means connecting said motor to said source, means including a reversible motor for adjusting said voltage varying means, and means including means responsive to variations in the tension of material let off from said member for causing said reversible motor to rotate in one direction to adjust said voltage varying means to increase the voltage supplied to said first motor upon an increase in the tension of said material, and for causing said reversible motor to rotate in the opposite direction to adjust said voltage varying means to decrease the voltage supplied to said first motor upon a decrease in the tension of said material.

2. A control system comprising a material let-off member, a first motor for driving said member, an electric power source, means including voltage varying means connecting said motor to said source, a second motor having an armature and forward and reverse field windings, connected to said voltage varying means for adjusting same, and means including means responsive to variations in the tension of material let off from said member for energizing said armature and one of said field windings for causing said second motor to rotate in a direction to adjust said voltage varying means to increase the voltage supplied to said first motor upon an increase in the tension of said material, and for energizing said armature and said other field winding for causing said second motor to rotate in the opposite direction to adjust said voltage varying means to reduce the voltage supplied to said first motor upon a decrease in the tension of said material.

3. A control system as claimed in claim 2 in which the means for energizing the armature and field windings of said second motor includes a pair of alternately operable switching means.

4. A control system as claimed in claim 2 in which the first motor has an armature connected to the power source, and means is provided for stopping the first motor, the last mentioned means including a switch for disconnecting the armature of the first motor from the power source, and includes a switch operated to place a short across the armature of the first motor.

5. A control system as claimed in claim 1 in which the first motor has an armature connected to the power source, in which means is provided for stopping the first motor, the last mentioned means including a switch for disconnecting the armature from the power source, and includes a switch operated to place a short across the armature.

6. A control system as claimed in claim 2 in which the first motor has an armature connected to the power source, in which means is provided for stopping the first motor, the last mentioned means including a switch for disconnecting the armature of the first motor from the power source, and includes a switch operated to place a short across the armature of the first motor.

7. A control system comprising a material let-off member; a direct current motor for driving said member; a rectifier connected to the armature of said motor; an alternating current power source, an auto-transformer winding connected to said source and having a slider electrically connected to said rectifier; an alternating current motor having an armature mechanically connected to said slider, and having a forward field winding and a reverse field winding; a first gaseous electron tube having principal electrodes connecting said armature of said alternating current motor and said forward field winding in series to said source, and having a control electrode; a second gaseous electron tube having principal electrodes connecting said armature of said alternating current motor and said reverse field winding in series to said source, and having a control electrode; said tubes being normally biased to cut-off; a source of positive voltage; first and second switches for connecting said control electrodes of said first and second tubes respectively, to said positive voltage source; and means responsive to variations in tension in material let off from said member for closing said first switch upon an increase in the tension of said material for firing said first thyratron and thereby energizing said alternating current motor in a direction to move said slider along said winding to increase the voltage supplied to said rectifier, and for closing said second switch upon a decrease in the tension of said material for firing said second thyratron and thereby energizing said alternating current motor in the opposite direction to move said slider along said winding to decrease the voltage supplied to said rectifier.

8. A control system is claimed in claim 7 in which means is provided for disconnecting said rectifier from said source and for placing a short across said armature of said direct current motor.

9. A control system as claimed in claim 8 in which a third switch is provided for connecting said armature of said alternating current motor and said forward field winding in series to said power source, and in which a fourth switch is provided for first disconnecting said rectifier from said power source and closing said third switch, and after a timing interval reconnecting said rectifier to said power source and opening said third switch.

10. A control system as claimed in claim 7 in which a third switch is provided for connecting said armature of said alternating current motor and said forward field winding in series to said power source, and in which a fourth switch is provided for first disconnecting said rectifier from said power source and closing said third switch, and after a timing interval reconnecting said rectifier to said power source and opening said third switch.

11. A control system comprising a material let-off member; a direct current motor having a field winding and an armature for driving said member; an alternating current power source; a first rectifier connecting said field winding to said source; a second rectifier connected to said armature, an autotransformer winding having a slider electrically connected to said second rectifier; an alternating current gear motor having an armature mechanically connected to said slider, and having forward and reverse field windings; a high tension switch adapted to be opened by abnormally high tension in material let off from said member; a first relay connected in series with said switch to said power source; a normally open master switch; a second relay; said first relay having normally closed contacts in series with said master switch and said second relay, said second relay having normally closed contacts connecting one side of said gear motor armature and one side of said autotransformer winding to said power source, and having normally open contacts connected to the brushes of said armature of said direct current motor; a first thyratron having its principal electrodes connecting said forward field winding and the other side of said gear motor armature in series to said source; a second thyratron having its principal electrodes connecting said reverse winding and said other side of said gear motor armature in series to said source; means normally biasing said thyratrons to cut-off; a source of positive voltage, first and second dancer switches for connecting the control electrodes of said thyratron to said positive voltage source, and means responsive to variations in the tension of said material for closing said first dancer switch upon an increase in the tension of said material for firing said first thyratron and thereby energizing said gear motor in a direction to move said slider along said winding to increase the voltage supplied to said second rectifier, and for closing said second dancer switch upon a decrease in the tension of said material for firing said second thyratron and thereby energizing said gear motor in the opposite direction to move said slider along said winding to decrease the voltage supplied to said second rectifier.

12. A control system as claimed in claim 11 in which the high tension switch, on an abnormal increase in the tension of the material, deenergizes the first relay, and connects said one side of said gear motor armature and said one side of said winding to the power source.

13. A control system as claimed in claim 11 in which the high tension switch, upon an abnormal increase in the tension of the material, deenergizes the first relay, and connects said one side of said gear motor armature and said one side of said winding to said power source.

14. A control system comprising a material let-off member, a first motor for driving said member, an electric source of power, means including voltage varying means connecting said motor to said source, means including a reversible motor for adjusting said voltage varying means, means responsive to variations in tension in material let off from said member for causing said reversible motor to rotate in one direction to adjust said voltage varying means to increase the voltage supplied to said first motor upon an increase in the tension of said material, and for causing said reversible motor to rotate in the opposite direction to adjust said voltage varying means to decrease the voltage supplied to said first motor upon the decrease in the tension of said material, timing means, and a relay controlled thereby, said relay being first operable to disconnect the first motor from the source of power and for so connecting the reversible motor to the source of power to rotate in a direction to increase the voltage from the source of power to be applied to the first motor, said relay in its second operation being operable in response to the timing out of the timing means to reconnect the first motor to the source of power.

15. A control system comprising a material let-off member, a first motor for driving said member, an electrical source of power, means including voltage varying means connecting said motor to said source of power, a second motor having an armature and forward and reverse field windings connected to said voltage varying means for varying the voltage, means including means responsive to the variation in tension in material let off from said member for energizing said armature and one of said field windings for causing said second motor to rotate in a direction to adjust said voltage varying means to increase the voltage supplied to said first motor upon an increase in tension of said material, and for energizing said armature and said other field winding for causing said second motor to rotate in the opposite direction to adjust said voltage varying means to reduce the voltage supplied to said first motor upon a decrease in tension of said material, timing means, and a relay controlled thereby, said relay being first operable to disconnect the first motor from the source of power and for so connecting the armature and a selected one of the two field windings of the second motor to the source of power to rotate in a direction to increase the voltage from the source of power to be applied to the first motor, said relay in its second operation being operable in response to the timing out of the timing means to reconnect the first motor to the source of power.

16. A control system comprising a material let-off member, a motor for driving said member, an electric power source, means including continuously adjustable voltage varying means connecting said motor to said source, movable means for adjusting said voltage varying means, and means including means responsive to variations in the tension in material let off from said member for moving said movable means in one direction to adjust said voltage varying means to increase the voltage supplied to said motor upon an increase in the tension of said material, and for moving said movable member in the opposite direction to adjust said voltage varying means to decrease the voltage supplied to said motor upon a decrease in the tension of said material; the motor having an armature connected to the power source, and in which means is provided for stopping the motor, the last mentioned means including a switch for disconnecting the armature from the power source, and includes a switch operated to place a short across the armature.

References Cited in the file of this patent
UNITED STATES PATENTS

| 2,285,654 | Hanna et al. | June 9, 1942 |
| 2,597,133 | Snyder | May 20, 1952 |